United States Patent [19]
Bobeck

[11] 3,713,119
[45] Jan. 23, 1973

[54] DOMAIN PROPAGATION ARRANGEMENT

[76] Inventor: Andrew Henry Bobeck, 41 Ellers Drive, Chatham, N.J. 07928

[22] Filed: May 14, 1971

[21] Appl. No.: 143,347

[52] U.S. Cl. ..340/174 TF, 340/174 EB, 340/174 SR
[51] Int. Cl. ........................G11c 21/00, G11c 11/14
[58] Field of Search ................................340/174 TF

[56] References Cited

UNITED STATES PATENTS

| | | | |
|---|---|---|---|
| 3,599,190 | 8/1971 | Smith | 340/174 TF |
| 3,470,547 | 9/1969 | Bobeck | 340/174 TF |

OTHER PUBLICATIONS

Magnetic Bubbles – A Technolog in the Making by Harry R. Karp, Electronics, Sept. 1, 1969, pp. 83–87.

*Primary Examiner*—James W. Moffitt
*Attorney*—R. J. Guenther and Kenneth B. Hamlin

[57] ABSTRACT

The geometry of the overlay pattern of elements which cause the movement of single wall domains in response to a reorienting in-plane field in single wall domain arrangements has been found to exhibit enhanced operating characteristics if the extremes of the elements therein are of enlarged geometry to concentrate flux.

6 Claims, 3 Drawing Figures

PATENTED JAN 23 1973 3,713,119

INVENTOR
A.H. BOBECK
BY Herbert M. Shapiro
ATTORNEY

DOMAIN PROPAGATION ARRANGEMENT

FIELD OF THE INVENTION

This invention relates to data processing arrangements and more particularly to such arrangements in which information is represented as single wall domains.

BACKGROUND OF THE INVENTION

The term "single wall domain" refers to a magnetic domain which is movable in a layer of a suitable magnetic material and is encompassed by a single domain wall which closes on itself in the plane of that layer.

Propagation arrangements for moving a domain are designed to produce magnetic fields of a geometry determined by the layers in which a domain is moved. Most materials in which single wall domains are moved are characterized by a preferred magnetization direction, for all practical purposes, normal to the plane of the layer. The domain accordingly constitutes a reverse magnetized domain which may be thought of as a dipole oriented transverse, nominally normal to the plane of the layer. Accordingly, the movement of a domain is accomplished by the provision of an attractive magnetic field normal to the layer and at a localized position offset from the position occupied by the domain. A succession of such fields causes successive movements of a domain as is well known.

One propagation arrangement comprises a pattern of electrical conductors each designed to form conductor loops which generate the requisite fields when externally pulsed. The loops are interconnected and pulsed in a three phase manner to produce shift register operation as disclosed in A. H. Bobeck et al., U.S. Pat. No. 3,460,116, issued Aug. 5, 1969.

An alternative propagation arrangement employs a pattern of soft magnetic elements adjacent the surface of a layer in which single wall domains are moved. In response to a magnetic field reorienting in the plane of the layer, changing pole patterns are generated in the elements. The elements are arranged to displace domains along a selected path in the layer as the in-plane field reorients. The familiar T-(or Y-) bar overlay arrangement responds to a rotating in-plane field to so displace domains. Arrangements of this type are called "field access" arrangements and are disclosed in A. H. Bobeck, U.S. Pat. No. 3,534,347 issued Oct. 13, 1970. Regardless of the mode of propagation, localized magnetic field gradients cause domain movement. In the field access mode, those gradients are caused by the accumulation of attracting and repelling poles in the overlay elements due to the in-plane field.

BRIEF DESCRIPTION OF THE INVENTION

In accordance with this invention, the elements which exhibit poles due to an in-plane field have enlarged ends. In one embodiment, a modification of the familiar T-bar and Y-bar magnetically soft channel-defining pattern includes elements with disc-shaped ends which give bar-shaped elements the appearance of dumbbells. Not only is high speed operation achieved at relatively low drive fields; but also turns in the channels defined by a succession of angularly displaced dumbbells exhibit exceptionally good margins.

DETAILED DESCRIPTION

Figure 1:
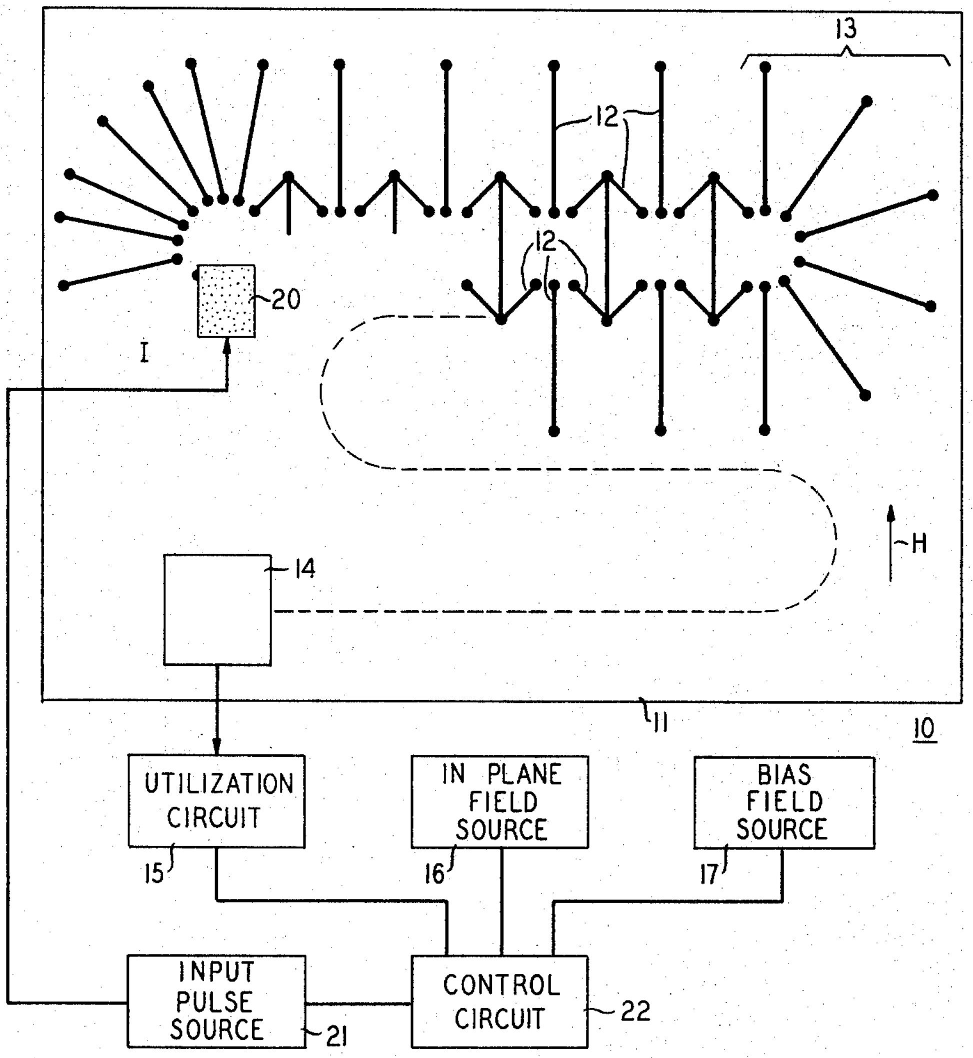
FIG. 1 is a schematic illustration of a propagation arrangement in accordance with this invention.

FIG. 1 shows a domain propagation arrangement 10 including a layer 11 of material in which single wall domains can be propagated. A propagation channel for single wall domains is defined by a pattern of elements 12 in which magnetic poles are generated in response to a magnetic field in the plane of layer 11. As the in-plane field reorients, illustratively by rotating clockwise as viewed, domains move from left to right from an input at I in FIG. 1.

A serpentine channel is illustrated showing straight line sections and turns 13 along which domains move to an output 14. The output, typically a magnetoresistive device applies signals to a utilization circuit 15 indicative of the presence and absence of domains during consecutive cycles of the in-plane field. A source of the in-plane field is represented by block 16 of FIG. 1.

In a typical domain propagation circuit, the diameter of a domain is maintained at some nominal value by a familiar bias field supplied by a source represented by block 17 of FIG. 1.

Figure 2:
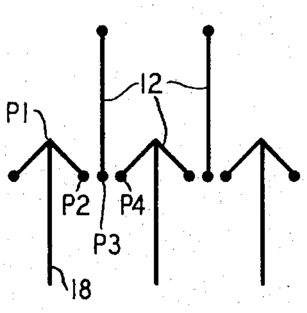
FIGS. 2 and 3 are schematic illustrations of portions of the arrangement of FIG. 1.

FIG. 2 shows a portion of a straight line section of the domain propagation channel of FIG. 1. In response to an assumed clockwise rotation of the in-plane field through four phases, a domain occupies the consecutive positions designated P1, P2, P3, and P4. The first phase is assumed to occur when the in-plane field is directed upward as indicated by the arrow H in FIG. 1. A domain, at this time occupies a position corresponding to the top of the long element 18 of FIG. 2 as is consistent with familiar field access propagation of single wall domains.

A domain pattern comprising the presence and absence of domains representative of information moving in the channel, occupies like positions with respect to consecutive periods of the overlay elements.

The field which is supplied by source 16 of FIG. 1 is called the drive field. The effective field (gradient) across a domain, however, determines the speed of operation and the overlay geometry determines the effective field. Consequently, that geometry is an important consideration in device design. For example, with a given domain layer, evaporated electrical conductors permit operation, to date, of up to three megacycles whereas field access circuitry has not yet permitted one megacycle operation with a like domain layer. It is clear, that improved overlay geometry could permit operation at speeds limited only by the intrinsic mobility of the material.

In accordance with this invention, the ends of the overlay elements are enlarged to provide a relatively highly concentrated flux configuration for a given drive field. The enlargement of the ends of the elements leads to increased data rates at lower drive fields than is obtained with like geometries without the enlarged ends. The reason for this is that the enlarged ends function to produce a greater field gradient across a domain for a given drive field because all the flux in elements aligned with the drive field leaves the elements from the enlarged ends.

It it well understood that for rectangular bar overlay elements, the demagnetizing field is defined as equal to the drive field which is required to achieve saturation at the center line of the bar giving rise to lines of flux originating from the entire length of the bar. When a drive field is further increased, the center line is widened into a saturated midsection. It is only when the drive field is much greater than the demagnetized field that the entire bar approaches saturation.

Figure 3:
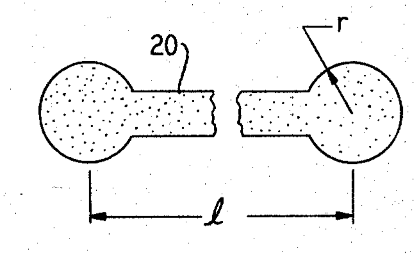

If the bar, on the other hand, includes relatively large ends, saturation of the entire element occurs at relatively lower drive fields. FIG. 3, to be specific, shows a dumbbell-shaped element of magnetically soft material (such as permalloy) comprising an elongated center section and enlarged ends in accordance with this invention. Each of the enlarged ends has a radius $r$ and the separation between the centers of the ends is designated $l$, the length of a corresponding bar element. The following mathematics determines the total amount of flux $\Phi$ leaving an end of the dumbbell and determines thereby the cross section of a magnetically saturated center section which gives rise to that flux.

The model employed is derived by analogy from that which represents the current between two conducting spheres of radii $a$ and $b$ spaced apart (center-to-center) by a distance $l$ in a resistive medium. The equation for the resistance is $$R=\frac{\sigma}{4}\pi\left(\frac{1}{a}+\frac{1}{b}-\frac{2}{l}\right), \quad (1)$$

where $\sigma$ is the resistivity of the medium. By analogy then, if we consider the permeability of air to be one, the permeability of the element of FIG. 3 to be infinite, and assume the presence of a magneto motive force MMF in the center section of the element of FIG. 3, then $$H \cdot l = MMF$$

where H is the applied field. But total flux $$\Phi = (MMF/R) \quad (2)$$

where R is the reluctance of the path. Also $$R=\frac{1}{4}\pi\left(\frac{2}{r}-\frac{2}{l}\right) \quad (3)$$

from equation (1) where $a = b$. Moreover, a typical overlay element $l$ $10 \approx r$. Therefore, $R \approx (1/2\pi r)$ and from (2)

$$\Phi = 2\pi r\, Hl \quad (4)$$

Also, total flux equal the flux density $B_s$ times the cross section of the path WT where W is the width and T the thickness of the element of FIG. 3. This leads to $$\Phi = B_s WT \quad (5)$$

For an assumed flux density of 8,000 gauss, an applied field of 20 oersteds, and for $l$, W and, $r$ equal to 20, 1.5, and 1.5 microns, respectively.

$$T=\frac{2\pi rlH}{B_s W} \approx 3{,}000 \text{ angstrom units.} \quad (6)$$

Consequently, we can determine an overlay element thickness at which the entire element saturates at a given drive field. The corresponding bar-shaped element of like thickness requires a much greater applied field of 40 oersteds for saturation in comparison.

Overlay elements having enlarged ends in accordance with this invention are also useful for forming turns and input sections. A turn 13 of FIG. 1, for example, includes elongated angularly displaced elements with enlarged ends. The operation of such a turn causes the expansion of a domain at some bias and drive fields as is described in my copending application Ser. No. 140,894 filed May 6, 1972.

An input arrangement, shown at I in FIG. 1, also comprises angularly displaced elements, the closely spaced ends of which form a path from a source of domains 20. Source 20 comprises a disc typically of magnetically soft permalloy about the periphery of which a domain moves in a manner to follow the in-plane field reorientation as is well known. Domains are supplied by source 20 under the control of input pulse source 21 in a now familiar manner. The various sources and circuits are under the control of control circuit 22 of FIG. 1 for synchronization and activation.

Not only do overlay elements with enlarged ends in accordance with this invention exhibit concentrated pole configurations, but also, the poles change in a relatively precise manner which results in a precise movement of domains with little tendency for a domain to stray erroneously along a prescribed element rather than to move from element to element. This point is made clear when it is recognized that a domain occupying the position of an expanded end of an element has little tendency to move to an area of the host material which corresponds to the lesser amount of magnetically soft material provided by the center bar between the enlarged ends of that element.

What has been described is considered merely illustrative of the principles of this invention. Therefore, various modifications can be devised by those skilled in the art in accordance with those principles within the spirit and scope of this invention.

What is claimed is:

1. A domain propagation arrangement comprising a layer of material in which single wall domains can be moved, and a pattern of magnetically soft elements juxtaposed with said layer for moving single wall domains in said layer in response to a reorienting in-plane field,each of said elements having a center section with a long dimension, a succession of said elements being disposed such that the long dimensions thereof when aligned with said in-plane field in consecutive orientations have an associated de-magnetizing field of a first value, said elements having a first geometry including an enlarged end portion such that each of said elements when aligned with said in-plane field is magnetically saturated for an in-plane field of less than said first value.

2. An arrangement in accordance with claim 1 wherein said first geometry comprises enlarged end portions.

3. An arrangement in accordance with claim 2 wherein enlarged end portions of successive ones of said elements are disposed with respect to one another along an axis for defining a path for the movement of single wall domains therealong.

4. An arrangement in accordance with claim 3 also including means for providing an in-plane field reorienting by rotation in the plane of said layer.

5. A magnetic domain arrangement comprising a layer of material in which single wall domains can be moved, and a pattern of magnetically soft elements juxtaposed with said layer and responsive to a reorienting in-plane field for moving single wall domains along a path, each of said elements comprising an elongated section having enlarged end portions with geometries such that alignment of said field with said elongated section of ones of said elements results in the concentration of flux in said ends.

6. An arrangement in accordance with claim 5 wherein said end portions are enlarged into a circular geometry.

* * * * *